US012594668B2

(12) United States Patent
Ren

(10) Patent No.: US 12,594,668 B2
(45) Date of Patent: Apr. 7, 2026

(54) BRAIN-LIKE DECISION-MAKING AND MOTION CONTROL SYSTEM

(71) Applicant: NEUROCEAN TECHNOLOGIES INC., Shenzhen (CN)

(72) Inventor: Hualong Ren, Shenzhen (CN)

(73) Assignee: NEUROCEAN TECHNOLOGIES INC., Shenzhen (CN)

( * ) Notice: Subject to any disclaimer, the term of this patent is extended or adjusted under 35 U.S.C. 154(b) by 1092 days.

(21) Appl. No.: 17/670,443

(22) Filed: Feb. 12, 2022

(65) Prior Publication Data

US 2022/0161421 A1 May 26, 2022

Related U.S. Application Data

(63) Continuation-in-part of application No. PCT/CN2020/108678, filed on Aug. 12, 2020.

(30) Foreign Application Priority Data

Aug. 12, 2019 (CN) .......................... 201910738132.7

(51) Int. Cl.
*B25J 9/16* (2006.01)

(52) U.S. Cl.
CPC ............... *B25J 9/161* (2013.01); *B25J 9/163* (2013.01); *B25J 9/1653* (2013.01); *B25J 9/1664* (2013.01)

(58) Field of Classification Search
CPC .......... B25J 9/161; B25J 9/163; B25J 9/1664; G06N 3/02; G05B 2219/33027
See application file for complete search history.

(56) References Cited

U.S. PATENT DOCUMENTS

| | | |
|---|---|---|
| 2007/0255454 A1 | 11/2007 | Dariush |
| 2013/0290234 A1 | 10/2013 | Harris et al. |

(Continued)

FOREIGN PATENT DOCUMENTS

| | | |
|---|---|---|
| CN | 102914967 A | 2/2013 |
| CN | 106027300 A | 10/2016 |

(Continued)

OTHER PUBLICATIONS

Liu et al. Robotic Episodic Learning and Behaviour Control Integrated with Neuron Stimulation Mechanism, with English Translation vol. 36, No. 5, Sep. 2014.

(Continued)

*Primary Examiner* — Tan H Tran
(74) *Attorney, Agent, or Firm* — Brooks Kushman P.C.

(57) ABSTRACT

A brain-like decision-making and motion control system is disclosed, this system comprises an active decision-making module, an automatic decision-making module, an evaluation module, a memory module, a perceptual module, a compound control module, an input channel module, an output channel module, and a controlled object module. The three working modes supported by the system include an active supervision mode, an automatic mode, and a feedback-driven mode, which enables the robot to make autonomous decisions to select targets and operations and delicately control actions in the process of interacting with the environment, and can make the robot learn new operations by trial and error, imitation, demonstration, with the flexibility to adapt to the complex task and the environment.

18 Claims, 6 Drawing Sheets

(56) References Cited

U.S. PATENT DOCUMENTS

| | | | | |
|---|---|---|---|---|
| 2014/0122398 | A1* | 5/2014 | Richert | G06N 3/02 |
| | | | | 706/15 |
| 2015/0298315 | A1 | 10/2015 | Shick et al. | |
| 2016/0303738 | A1* | 10/2016 | Laurent | G05D 1/222 |
| 2017/0024877 | A1* | 1/2017 | Versace | G06F 18/253 |
| 2018/0319015 | A1* | 11/2018 | Sinyavskiy | G05D 1/0088 |
| 2019/0118380 | A1 | 4/2019 | Xiong et al. | |
| 2020/0405403 | A1* | 12/2020 | Shelton, IV | A61B 17/3421 |

FOREIGN PATENT DOCUMENTS

| | | | |
|---|---|---|---|
| CN | 106796665 | A | 5/2017 |
| CN | 108062108 | A | 5/2018 |
| CN | 108568819 | A | 9/2018 |
| CN | 109227543 | A | 1/2019 |
| CN | 109407518 | A | 3/2019 |
| CN | 109630154 | A | 4/2019 |
| CN | 109799727 | A | 5/2019 |
| CN | 109817329 | A | 5/2019 |
| CN | 110000781 | A | 7/2019 |
| CN | 110013312 | A | 7/2019 |
| CN | 110037696 | A | 7/2019 |

OTHER PUBLICATIONS

Guo et al. Environmental Perception of Mobile Robot, Publisher: IEEE, Environmental Perception of Mobile Robot | IEEE Conference Publication | IEEE Xplore, Feb. 9, 2022, 3 pages.
International Search Report for PCT/CN2020/108678, prepared by the China National Intellectual Property Administration, mailing date Nov. 17, 2020, 4 pages including English Translation.

* cited by examiner

BRAIN-LIKE DECISION-MAKING AND MOTION CONTROL SYSTEM

CROSS-REFERENCE TO RELATED APPLICATIONS

This application is a continuation-in-part of International patent application Serial No. PCT/CN2020/108678, with an international filing date of Aug. 12, 2020, which claims priority to Chinese patent application No. 201910738132.7, filed on Aug. 12, 2019, and entitled "brain-like decision-making and motion control system", the contents of which are incorporated herein by reference in entirety.

TECHNICAL FIELD

The present application relates to the technical fields of artificial intelligence, brain-like neural network and motion control of robot, and particularly relates to a brain-like decision-making and motion control system.

BACKGROUND

The ability of robot hand (i.e., dexterous hand) in conjunction with cameras to operate complex objects, as well as the bipedal and multi-legged walking and motion balance of robots, are two important technical points for a service robot with complex operation capabilities to enter the industry and home applications.

The number of degrees of freedom of this type of robot system is usually very high, as a result the problems of motion planning and motion control are very complicated. There are many reasons for this. First, it is difficult to use inverse kinematics to solve the trajectory of a system with a high number of degrees of freedom. In particular, the computational complexity is very high and the solutions are often not unique, so the robot needs to select and synthesize the appropriate operation execution in the possible action sequence space. Second, the robot needs to be able to independently select a series of appropriate targets and operations in the process of interaction with the environment and make adjustments according to the feedback. The decision-making and operation execution should be generically integrated with the internal state of the system, external environmental information, and historical information. The robot should also be able to adjust existing operations or learn new ones through trial and error, imitation and demonstration to adapt to complex and ever-changing tasks and environments. Third, the robot should be able to start execution from any sub-action/meta-action amid an action sequence, and also to select, switch and delicately control each sub-action/meta-action, so as to start execution from different initial states of the task and flexibly adapt to the changes and interference of the object being operated.

SUMMARY

One of the purposes of the embodiments of the present disclosure is to provide a brain-like decision-making and motion control system, which aims to solve the problem that robots in the prior art cannot effectively combine environmental information and memory information in the process of interacting with the environment to independently make decisions and select targets, and cannot flexibly select, synthesize and execute operations (i.e., action sequences) and delicately control each sub-action/meta-action. The proposed brain-like decision-making and motion control system also aims to solve the problem that the prior art cannot support robots to execute from different initial states of the task and flexibly adapt to the changes and interference of the operated object, and cannot effectively support robots to perform autonomous trial-and-error learning or imitation learning to learn new motions and trajectories.

In order to solve the above-mentioned technical problems, the technical solutions adopted in the embodiments of the present disclosure relates to a brain-like decision-making and motion control system comprising an active decision-making module; an automatic decision-making module; an evaluation module; a memory module; a perceptual module; a compound control module; an input channel module; an output channel module; and a controlled object module, wherein the active decision-making module is configured to synthesize perceptual information from the perceptual module and memory information from the memory module so as to actively select a first target and a first operation in combination with decision rules and instruct the compound control module to delicately perform the first operation, and to control the input channel module and the output channel module, wherein the automatic decision-making module is configured to automatically select a second target and a second operation to be performed according to an experience value, the perceptual information and the memory information when a computational load of the active decision-making module is too heavy or when a prompt response is needed by the brain-like decision-making and motion control system, to instruct the compound control module to perform the second operation, and to assist the active decision-making module to make comprehensive decisions, wherein the evaluation module is configured to evaluate a practical value of a performed target and an actual effect value of a performed operation through a feedback of an internal or an external environment of the brain-like decision-making and motion control system, and to return a predictive error to the active decision-making module, the automatic decision-making module and/or the compound control module, wherein the memory module is configured to encode and record historical information of an internal state of the brain-like decision-making and motion control system and historical information of the external environment into the memory information, and to transmit the memory information to the active decision-making module and/or the automatic decision-making module to assist a decision process, and to transmit the memory information to the compound control module to affect a selection and an execution of action sequences, wherein the perceptual module is configured to process sensing information obtained from one or more sensors into the perceptual information, and to transmit the perceptual information to the active decision-making module, the automatic decision-making module, the evaluation module, the memory module, and the compound control module, wherein the perceptual information comprises video information, audio information, force feedback information, temperature information, tactile information, joint angle, angular velocity, angular acceleration information, displacement, velocity, acceleration information, and/or attitude and balance information, wherein the compound control module comprises a plurality of basic control units, wherein each basic control unit comprises a plurality of neurons, wherein the plurality of neurons comprises at least one first neuron configured to accept input from the active decision-making module, wherein the plurality of neurons of each basic control unit comprises at least one second neuron configured to be connected with one or more neurons located in said each basic control unit to form unidirectional or reciprocal excitatory or inhibitory connections, wherein the plurality of neurons of each basic control unit comprises at least one third neuron configured to be connected with one or more neurons located in at least one basic control unit other than said each basic control unit to form the unidirectional or reciprocal excitatory or inhibitory connections, wherein the plurality of neurons comprises at least one fourth neuron configured to be connected to the output channel module or the evaluation module, wherein the connections are configured to learn, memorize, encode, delicately control, anticipate or execute one or more action sequences through synaptic plasticity processes, and to assist the active decision-making module to perform preferentially or comprehensively among the action sequences, wherein the input channel module is configured to convert, relay, and amplify the perceptual information transmitted from the perceptual module, and output the perceptual information to the active decision-making module or the autonomous decision-making module and/or the compound control module respectively, wherein the input channel module is configured to accept a control signal input from the active decision-making module to adjust signal relay magnification, wherein the output channel module is configured to convert, relay, amplify an output signal of the compound control module, and to transmit the output signal to the compound control module, wherein the output channel module is configured to accept a control signal input from the active decision module to adjust the signal relay magnification, wherein the controlled object module comprises one or more executive elements.

As can be seen from the aforesaid technical solutions, compared with the prior art, the present disclosure discloses a brain-like decision-making and motion control system, which provides an active decision-making module and an automatic decision-making module. The proposed system can not only perform a comprehensive decision with reference to the multi-modal perception information, memory information and decision rule, but also make a fast decision mainly according to the experience information in combination with few perceptual information and memory information. Moreover, the active decision-making module and the automatic decision-making module is able to reach a consensus, adjust the system's expectation on the target and operation according to the feedback from the environment obtained by the evaluation module, and learn new operation through the trial and error, imitation and demonstration. Thus the proposed robotic system is able to be more adaptable to complex and changeable tasks and environments. In addition, the compound control module disclosed in the present disclosure can realize selection, synthesis and execution of multiple action sequences, and also start execution from any meta-action in the action sequences, and further realize selection, delicate control and execution of meta-actions. As a result, the proposed robotic system is able to perform task from different initial states of the task and be flexibly adaptive to changes and interference to operated object. The proposed system is particularly suitable for motion planning and control of a robot with multiple degrees of freedom, dexterous hand operation in coordination with camera, walking and balancing of bipedal or multi-legged robot, antagonistic control of multiple executive elements, and the like.

BRIEF DESCRIPTION OF THE DRAWINGS

In order to describe the embodiments of the present disclosure more clearly, a brief introduction regarding the accompanying drawings that need to be used for describing the embodiments of the present disclosure or demonstrated technology is given below. It is apparent that the accompanying drawings described below are only some embodiments of the present disclosure, the person of ordinary skill in the art may also obtain other drawings according to the these drawings without paying creative effort.

DETAILED DESCRIPTION OF THE PRESENT INVENTION

In order to make the objectives, technical solutions and advantages of the present invention more clearly understood, the present invention will be further described in detail below with reference to the accompanying drawings and the embodiments. It should be understood that the embodiments described in detail herein are merely intended to illustrate but not to limit the present invention.

In order to describe the technical solutions of the present invention, the technical solutions are described in detail below with reference to the specific drawings and embodiments.

Figure 1:
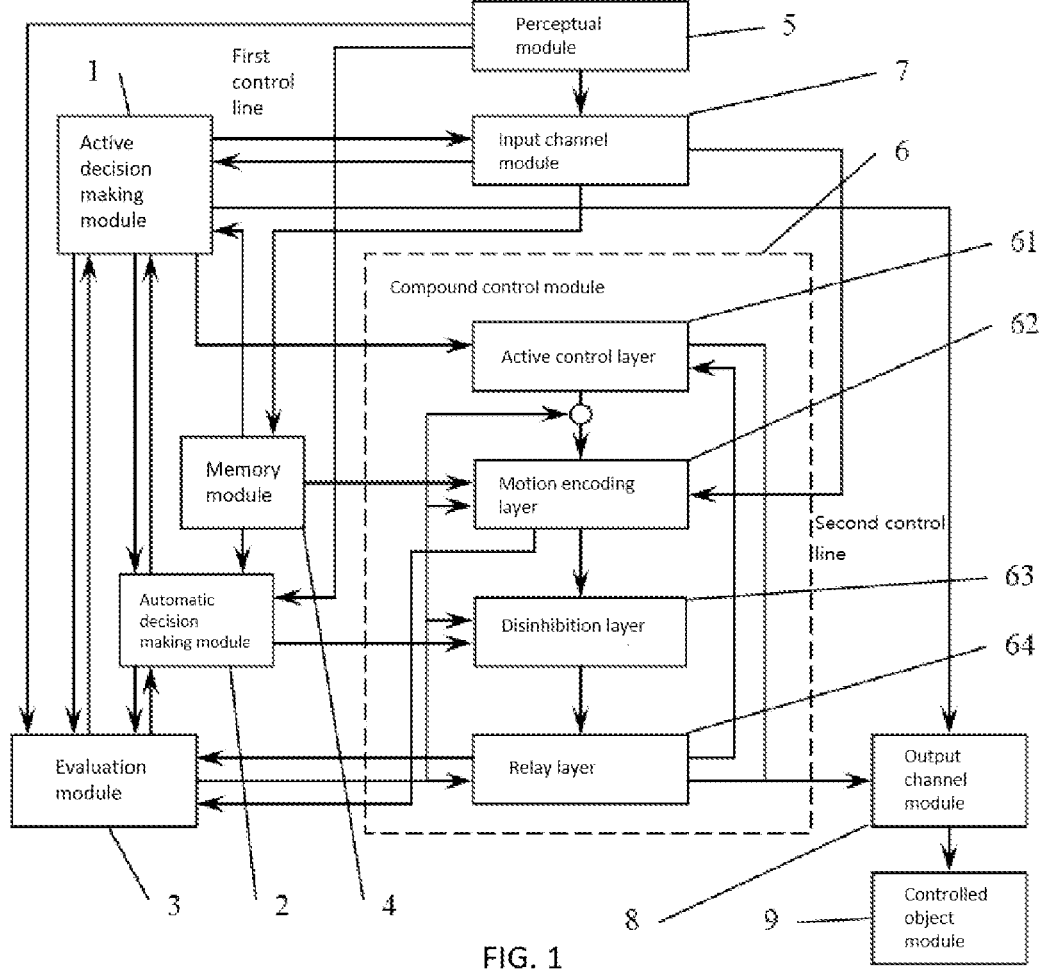
FIG. 1 illustrates a schematic diagram of an overall architecture of a brain-like decision-making and motion control system according to the present disclosure.

Referring to FIG. 1, one embodiment of the present disclosure discloses a brain-like decision-making and motion control system. The system comprises an active decision-making module 1; an automatic decision-making module 2; an evaluation module 3; a memory module 4; a perceptual module 5; a compound control module 6; an input channel module 7; an output channel module 8; and a controlled object module 9.

The active decision-making module 1 is configured to synthesize perceptual information from the perceptual module 5 and memory information from the memory module 4 so as to actively select a first target and a first operation in combination with decision rules and instruct the compound control module 6 to delicately perform the first operation, and to control the input channel module 7 and the output channel module 8.

The automatic decision-making module 2 is configured to automatically select a second target and a second operation to be performed according to an experience value, the perceptual information and the memory information when a computational load of the active decision-making module is too heavy or when a prompt response is needed by the brain-like decision-making and motion control system, to instruct the compound control module 6 to perform the second operation, and to assist the active decision-making module 1 to make comprehensive decisions.

The evaluation module 3 is configured to evaluate a practical value of a performed target and an actual effect value of a performed operation through a feedback of an internal or an external environment of the brain-like decision-making and motion control system, and to return a predictive error to the active decision-making module 1, the automatic decision-making module 2 and/or the compound control module 6.

The memory module 4 is configured to encode and record historical information of an internal state of the brain-like decision-making and motion control system and historical information of the external environment into the memory information, and to transmit the memory information to the active decision-making module 1 and/or the automatic decision-making module 2 to assist a decision process, and to transmit the memory information to the compound control module 6 to affect a selection and an execution of action sequences.

The perceptual module 5 is configured to process sensing information obtained from one or more sensors into the perceptual information, and to transmit the perceptual information to the active decision-making module 1, the automatic decision-making module 2, the evaluation module 3, the memory module 4, and the compound control module 6, wherein the perceptual information comprises video information, audio information, force feedback information, temperature information, tactile information, joint angle, angular velocity, angular acceleration information, displacement, velocity, acceleration information, and/or attitude and balance information.

The compound control module 6 comprises a plurality of basic control units 65, wherein each basic control unit 65 comprises a plurality of neurons, wherein the plurality of neurons comprises at least one first neuron configured to accept input from the active decision-making module 1, wherein the plurality of neurons of each basic control unit 65 comprises at least one second neuron configured to be connected with one or more neurons located in said each basic control unit 65 to form unidirectional or reciprocal excitatory or inhibitory connections, wherein the plurality of neurons of each basic control unit 65 comprises at least one third neuron configured to be connected with one or more neurons located in at least one basic control unit other than said each basic control unit to form the unidirectional or reciprocal excitatory or inhibitory connections, wherein the plurality of neurons comprises at least one fourth neuron configured to be connected to the output channel module 8 or the evaluation module 3, wherein the connections are configured to learn, memorize, encode, delicately control, anticipate or execute one or more action sequences through synaptic plasticity processes, and to assist the active decision-making module 1 to perform preferentially or comprehensively among the action sequences. In this case, a preferentially execution can be the execution of the winning action sequence by competitive selection (among action sequences candidates).

The input channel module 7 is configured to convert, relay, and amplify the perceptual information transmitted from the perceptual module 5, and output the perceptual information to the active decision-making module 1 or the autonomous decision-making module 2 and/or the compound control module 6 respectively, wherein the input channel module is configured to accept a control signal input from the active decision-making module 1 to adjust signal relay magnification.

The output channel module 8 is configured to convert, relay, amplify an output signal of the compound control module 6, and to transmit the output signal to the compound control module 6, wherein the output channel module 6 is configured to accept a control signal input from the active decision module 1 to adjust the signal relay magnification.

The controlled object module 9 comprises one or more executive elements.

In some embodiments, the active decision-making module 1 comprises a target set, a target-operation-effect set, and a decision rule set.

The target set is configured to record one or more appeared targets that have appeared, and a respective comprehensive value and a respective urgency value of each appeared target, and to set the respective comprehensive value of each target that has not appeared as a first pre-set value to represent a curiosity value for each target that has not appeared.

The target-operation-effect set is configured to record one or more executable operations each is executable for a respective target, and to record a respective comprehensive effect value of each executable operation in this situation.

The decision rule set is configured to record the decision rules, wherein said decision rules comprise first decision rules defined by users and second decision rules newly learned by the brain-like decision-making and motion control system, wherein the decision rules are configured to specify how the brain-like decision-making and motion control system selects a potential selected target and a potential selected operation.

After a first potential selected target is selected by the active decision-making module 1, the active decision-making module 1 is configured to transmit the first potential selected target and the respective comprehensive value of the first potential selected target to the evaluation module, and to select a first potential selected operation according to the first potential selected target from the target-operation-effect set.

The active decision-making module 1 is configured to perform, if a second potential selected target and a second potential selected operation selected by the automatic decision-making module 2 are transmitted from the automatic decision-making module 2 to the active decision-making module 1, weighting on the first potential selected target and the first potential selected operation and the second potential selected target and the second potential selected operation to generate a final decision.

After the active decision-making module 1 has decided to perform a decided operation according to the final decision, the active decision-making module 1 is configured to transmit the executable operation and the comprehensive effect values of the executable operation to the evaluation module 3, and to transmit the executable operation in a form of spiking sequence signal to the compound control module through an active-start-control pathway and an active-stop-control pathway.

When receiving a predictive error of the executable operation or a corresponding target of the executable operation transmitted from the evaluation module 3, the active decision-making module 1 is configured to add the predictive error to a current comprehensive value of said corresponding target or a current comprehensive effect value of the executable operation to obtain an updated comprehensive value or an updated comprehensive effect value, and to update the updated comprehensive value and the updated comprehensive effect value into the target set and the target-operation-effect set, respectively.

In some embodiments, the decision rules comprise target selection rules for the active decision-making module 1 to select the potential selected target. Said target selection rules comprise one or more of:

1) selecting the potential selected target from the one or more appeared targets if the potential selected target is with a largest weighting of the respective comprehensive value and the respective urgency value among the appeared targets;

2) selecting the potential selected target from the one or more appeared targets if the potential selected target is most relevant to a task among the appeared targets and does not conflict with the first decision rules and the second decision rules;

3) selecting the potential selected target from the appeared targets if the potential selected target is a most obvious target among the appeared targets;

4) selecting the potential selected target by the automatic decision-making module 2;

5) selecting the potential selected target randomly;

6) selecting the potential selected target by selecting a hypothetical target that has not appeared; and 7) selecting the potential selected target by ignoring the appeared targets and directly entering an operation selection process.

The decision rules comprises operation selection rules, wherein the operation selection rules comprise one or more of:

1) selecting the potential selected operation with a maximum comprehensive effect value corresponding to the potential selected target in the target-operation-effect set;

2) performing a trial and error learning and selecting the potential selected operation randomly;

3) performing an imitation learning and executing a new action sequence by actively supervising the compound control module 2;

4) taking no action and waiting;

5) performing an automatic selection operation by the automatic decision-making module 2; and 6) performing a predictive learning and rehearsal of a set of actions without actually performing said actions so as to predict effect values of the actions.

The operation selection rules and target selection rules may be implemented in coordination with each other.

In some embodiments, the automatic decision-making module 2 comprises a target set and a target-operation-effect set.

The target set is configured to record one or more appeared targets that have appeared, and to record a respective experience value of each appeared target, wherein the target set is configured to set the respective experience value of each target that has not appeared as a respective second pre-set value.

The target-operation-effect set is configured to record one or more respective pre-set operations that can be performed under each appeared/not-yet-appeared target and a respective experience effect value of each respective pre-set operation.

The automatic decision-making module 2 is configured to select a first potential selected target from the appeared targets, wherein said first potential selected target is with a maximum experience value among the appeared targets, wherein the automatic decision-making module 2 is then configured to transmit the first potential selected target and the respective experience value of the first potential selected target to the evaluation module 3, and to select a first potential selected operation from the target-operation-effect set according to the first potential selected target, wherein the first potential selected operation is with a maximum respective experience effect value among the respective pre-set operations corresponding to the first potential selected target from the target-operation-effect set, and to transmit the first potential selected operation and the respective experience effect value of the first potential selected operation to the evaluation module 3.

The automatic decision-making module 2 is further configured to send the first potential selected target and the first potential selected operation to the active decision-making module 1 to form a consensus, and to transmit the first potential selected operation in a form of spiking signal to the compound control module 6 through an active-start-control pathway and an active-stop-control pathway if the active decision-making module 1 does not defer or deny, wherein the active decision module 1 is further configured to determine a final decision rule if the active decision-making module 1 denies, wherein if the active decision-making module 1 transmits a second potential selected operation, which is determined by the active decision-making module 1, to the compound control module 6 and if the automatic decision-making module 1 transmit the selected potential operation to the compound control module 6, the compound control module 6 is then configured to synthesize the first potential selected operation and the second potential selected operation.

When receiving a predictive error signal of the executable operation or the respective target of the executable operation transmitted from the evaluation module 3, the active decision-making module 1 is configured to add a predictive error to a current comprehensive value of said first potential selected target or a current comprehensive effect value of said first potential selected operation to obtain an updated comprehensive value or an updated comprehensive effect value, and to update the updated comprehensive value and the updated comprehensive effect value into the target set and the target-operation-effect set, respectively.

In some embodiment, the evaluation module 3 comprises a cache and an evaluation rule set.

When the active decision-making module 1 transmits the first target and a comprehensive value of the first target or transmits a first operation and a comprehensive effect value of the first operation to the evaluation module 3, the evaluation module 3 is configured to cache the first target, the comprehensive value of the first target, the first operation, and the comprehensive effect value of the first operation, wherein when the feedback or a result is obtained by the brain-like decision-making and motion control system, the evaluation module 3 is configured to evaluate an actual value of the first target or an actual effect value of the first operation according to evaluation rules in the evaluation rule set, and to subtract the cached comprehensive value of the first target from the actual value of the first target or subtract the cached comprehensive effect value of the first operation from the actual effect value of the first operation to obtain a predictive error of the first target or the first operation, and to further transmit the predictive error to the active decision-making module 1 so as to correct the comprehensive value of the first target or the first operation stored in the active decision-making module 1.

When the automatic decision-making module 2 transmits the second target and an experience value of the second target or transmits a second operation and an experience effect value of the second operation to the evaluation module 3, the evaluation module 3 is configured to cache the second target, the experience value of the second target, the second operation, and the experience effect value of the second operation, wherein when the feedback or the result is obtained by the brain-like decision-making and motion control system, the evaluation module 3 is configured to evaluate the actual value of the second target or the actual effect value of the first operation according to the evaluation rules, and to subtract the cached experience value of the second target from the actual value of the first target or subtract the cached experience effect value of the first operation from the actual effect value of the first operation to obtain the predictive error of the second target or the second operation, and to further transmit said predictive error to the active decision-making module 1 so as to correct the comprehensive value of the first target or the first operation stored in the active decision-making module 1.

The evaluation module 3 is further configured to transmit the predictive error to the compound control module 6 to correct the action sequences encoded by the compound control module 6 and a predictive effect value of the action sequences.

There is a positive correlation between the amplification of the input channel module 7 and the influence of perceptual information on the decision-making and motion execution of the system. When the magnification factor is higher, the decision-making and motion execution of the system are more influenced by perceptual information. When the magnification factor is lower, the decision-making and motion execution of the system are less affected by perceptual information. When the magnification factor is zero, the decision-making and motion execution of the system are not affected by the perceptual information.

There is a positive correlation between the amplification of the input channel module 7 and the influence of perceptual information on the decision-making and motion execution of the system. When the magnification is higher, the execution intensity of the controlled object is higher. When the magnification is lower, the execution intensity of the controlled object module 9 is lower. When the magnification is zero, the output of compound control module 6 is prevented from being transmitted to controlled object module 9, and the action sequence is anticipated in the system instead of actually executed.

In some embodiments, the executive elements are configured as one or more motors, hydraulic components, pneumatic components or artificial muscles, wherein each executive element is coupled to the one or more basic control units through the output channel module 8 so as to perform at least one meta-action, wherein a pair of executive elements are respectively coupled to the one or more basic control units 65 through the output channel module 8 to form antagonistic control.

The output signal of the compound control module 6 is output to the controlled object module 9 through the output channel 8. The output signal is a spiking sequence signal. The output channel 8 converts the frequency of the spiking sequence signal into an input voltage value and/or a current value of an executive element, and converts time duration of continuous spiking into an input voltage and/or a current value of the executive element. The greater the frequency of spiking is, the greater the movement range and the force intensity of the corresponding executive element are. A person of ordinary skill in the art should be aware that the longer the time duration of the continuous spiking is, the longer the output time of the corresponding executive element is, and vice versa.

Figure 2:
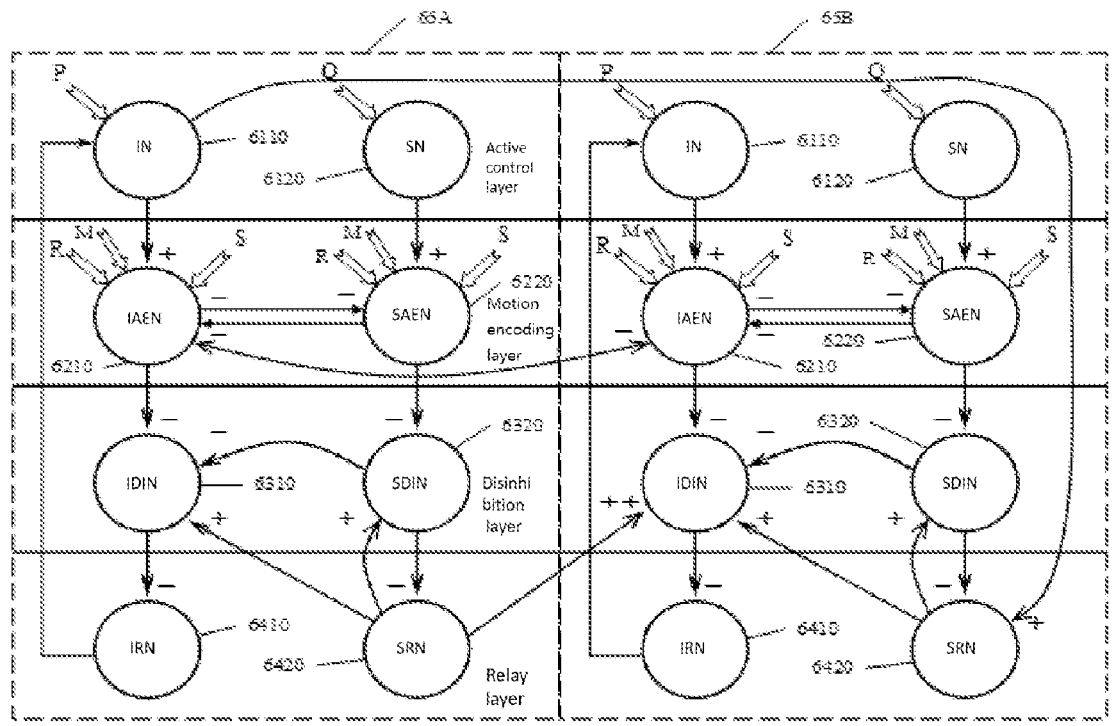
FIG. 2 illustrates a schematic diagram of a basic control unit of the brain-like decision-making and motion control system according to one embodiment of the present disclosure.

Referring to FIG. 2, each operation represents a combination of one or more action sequences. Each action sequence is composed of one or more meta-actions arranged in a time dimension. There are zero to a plurality of meta-actions that occur at any point of time. The same meta-action occurs at one time point or at different time points. Each meta-action represents a minimum action that can be performed by the corresponding executive element.

In some embodiments as shown in FIG. 2, each basic control unit 65 comprises an active control layer 61; a motion encoding layer 62; a disinhibition layer 63; and a relay layer 64.

The active control layer 61 comprises an initiating neuron (IN) 6110 and a stopping neuron (SN) 6120.

The motion encoding layer 62 comprises an initiating action encoding neuron (IAEN) 6210 and a stopping action encoding neuron (SAEN) 6220.

The disinhibition layer 63 comprises an initiating disinhibitory neuron (IDIN) 6310 and a stopping disinhibitory neuron (SDIN) 6320.

The relay layer 64 comprises an initiating relay neuron (IRN) 6410 and a stopping relay neuron (SRN) 6420.

Figure 3:
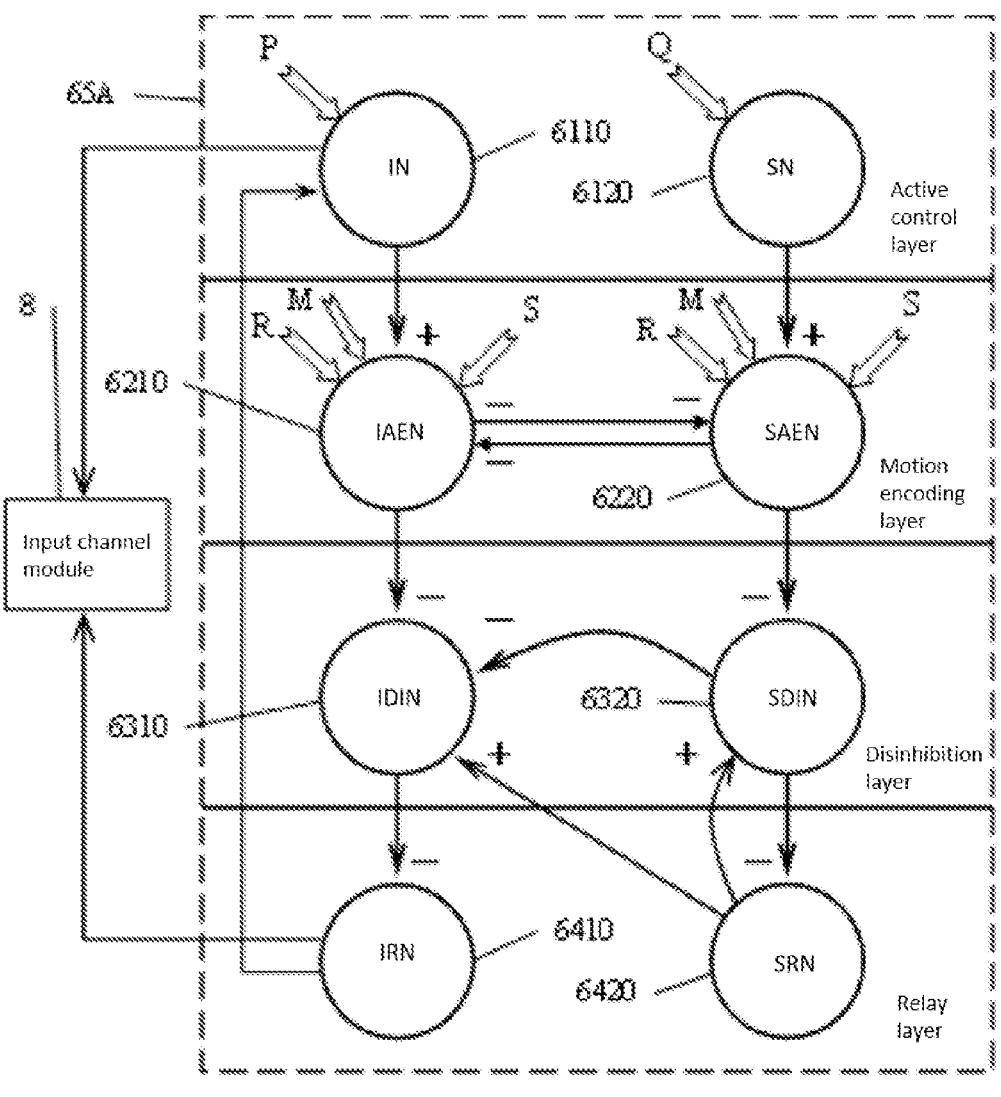
FIG. 3 illustrates a schematic diagram of an output-based basic control unit of the brain-like decision-making and motion control system according to one embodiment of the present disclosure.

Referring to FIG. 3, in the active control layer 61, the IN 6110 is configured to receive an active start signal P from the active decision-making module 1 and an excitatory connection of the IRN 6410, the SN 6120 is configured to receive an active stop signal Q from the active decision-making module 1, the IN 6110 and the SN 6120 are configured to respectively synthesize and encode input signals into spiking signals and output the spiking signals to the IAEN 6210 and the SAEN 6120 in the motion encoding layer 62.

In the motion encoding layer 62, the IAEN 6210 is configured to receive excitatory input signals from the IN 6110, and the SAEN 6220 is configured to receive the excitatory input signals from the SN 6120, wherein the IAEN 6210 and the SAEN 6220 are configured to receive the input signals from the memory module 4, the perceptual module 5 and the evaluation module 3 (referring to M, S, R in FIGS. 2, 3, 4, respectively), wherein the IAEN 6210 and the SAEN 6220 are configured to respectively synthesize the input signals to generate the spiking signals so as to modulate pulse discharge frequency and phase of the IDIN 6310 and the SDIN 6320 in the disinhibition layer 63.

One or more reciprocal inhibitory connections are between the IAEN 6210 and the SAEN 6220 in a same basic control unit 65, wherein relative action intensity and relative duration of the meta-action corresponding to said same basic control unit 65 are configured to be encoded by synaptic weights.

Figure 6:
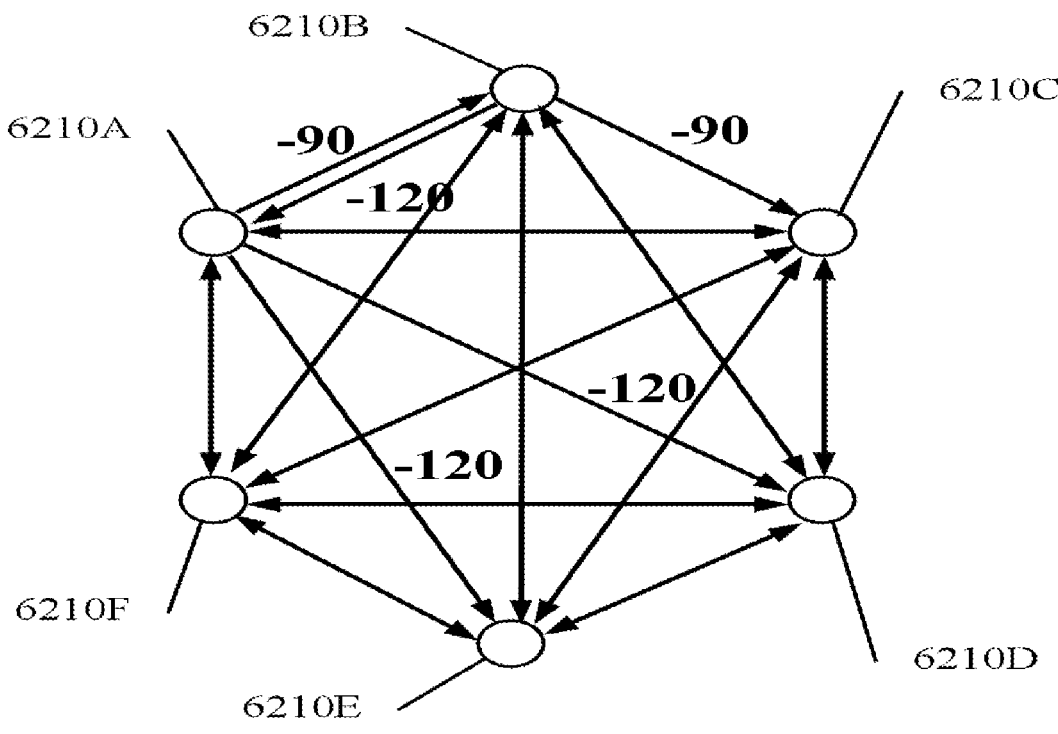
FIG. 6 illustrates a schematic diagram of an interconnection of various initiating action encoding neurons of the brain-like decision-making and motion control system according to one embodiment of the present disclosure.

Referring to FIG. 6, the reciprocal inhibitory connections are between the IAENs 6210 in multiple basic control units 65, wherein an execution sequence of a respective meta-action in the action sequences is configured to be encoded by the synaptic weights.

The inhibitory connections are between the IAENs 6210 and the SAENs 6220 in different basic control units 65, wherein a relative start time and a relative stop time of the respective meta-action in the action sequences are configured to be encoded by the synaptic weights.

In the disinhibition layer 63, the DIN 6310 is configured to receive inhibitory input signals from the IAEN 6210 and the SDIN 6320, and the excitatory input signals from the SRN 6420, and to synthesize all the input signals to generate the spiking signals, and to modulate the pulse discharge frequency and phase of the IRN 6410 through the inhibitory connections, wherein the SDIN 6320 is configured to receive the inhibitory input signals from the SAEN 6220 and the excitatory input signals from the SRN 6420, and to synthesize all the input signals to generate the spiking signals, and to modulate the pulse discharge frequency and phase of the SRN 6420 through the inhibitory connections.

In the relay layer 64, the IRN 6410 is configured to receive the inhibitory input signals from the IDIN 6310, and to form a positive feedback closed loop so as to promote motion execution through the excitatory connection projected to the IN 6110, wherein the SRN 6420 is configured to receive the excitatory input signals from the SN 6120 and the inhibitory input signals from the SDIN 6320, to synthesize all the input signals to generate spiking signals, and to project the spiking signals to the IDIN 6310 through the excitatory connection to form a pathway for inhibiting execution of actions.

The IN 6110, the SN 6120, the IAEN 6210, the SAEN 6220, the DIN 6310, the SDIN 6320, the IRN 6410 and the SRN 6420 are served as outputs of the basic control units 65.

The basic control unit 65 is divided into an output basic control unit 65A and a predictive control unit 65B according to an output connection mode.

Referring to FIG. 3, the output of the output basic control unit 65A is connected to the output channel module 8 to drive the executive elements.

Figure 4:
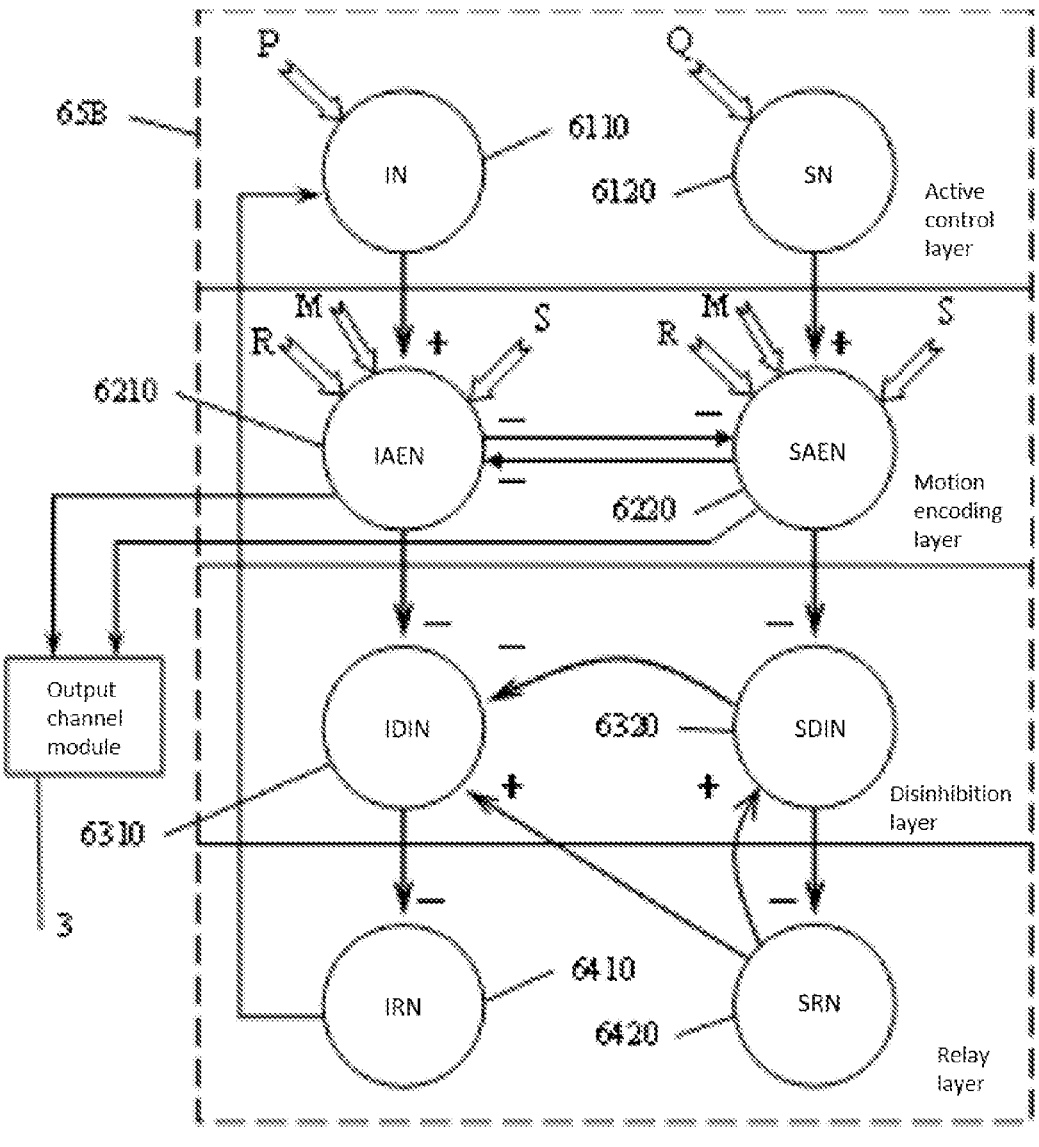
FIG. 4 illustrates a schematic diagram of a predictive basic control unit of the brain-like decision-making and motion control system according to one embodiment of the present disclosure.

Referring to FIG. 4, the output of the predictive basic control unit 65B is coupled to the evaluation module 3 to predict a predictive effect value of the action sequences without actually executing said action sequences.

Figure 5:
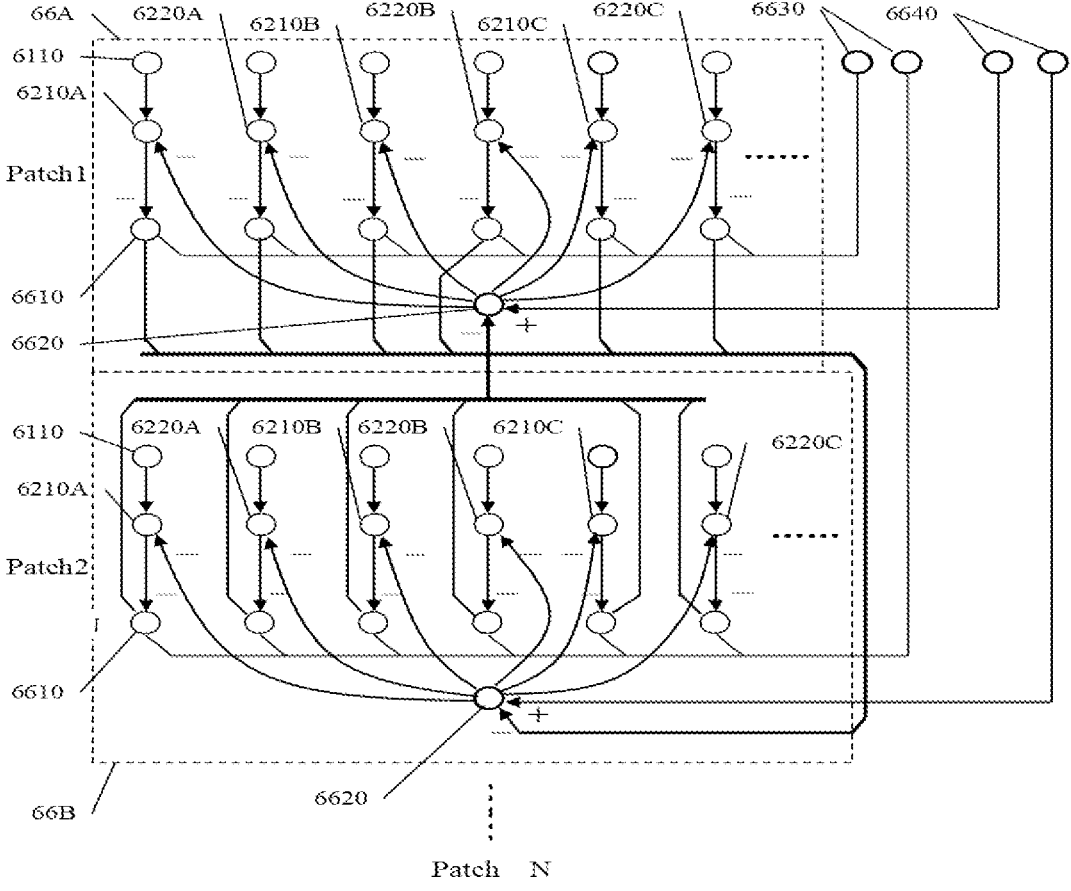
FIG. 5 illustrates a schematic diagram of an auxiliary basic control unit of the brain-like decision-making and motion control system according to one embodiment of the present disclosure.

Referring to FIG. 5, the compound control module 6 further comprises one or more auxiliary control units 66.

Each auxiliary control unit 66 comprises an active selection signal input terminal 6630, an active de-selection signal input terminal 6640, a lateral disinhibitory neuron (LDIN) 6610, and a fast spontaneous inhibitory neuron (FSIN) 6620, so as to actively or automatically select or execute in multiple alternative action sequences.

The one or more basic control units 65 are configured to form a group of the basic control units, and each group of the basic control units 65 encodes the action sequence.

The IAEN 6210 and the SAEN 6220 in the same basic control unit 65 are respectively connected to the LDIN 6610.

Each group of the basic control units 65 is configured to share one or more FSINs 6620.

The LDIN 6610 is configured to synthesize the active selection signal input and the input of the neurons in the motion encoding layer 62 of the basic control unit 65 to generate spiking signals and output the spiking signal to the FSIN 6620 in other groups of basic control units 65 through the inhibitory connections.

The FSIN 6620 is configured to synthesize the active de-selection signal input and inputs of the LDIN in adjacent groups of the basic control units to generate the spiking signals and output the spiking signals to each motion control layer of the group of the basic control units through the inhibitory connections.

The active selection signal input 6630 is configured to accept the input from the active decision-making module 1 to actively select a specific action sequence for execution.

The active de-selection signal input 6640 is configured to receive an input from the active decision-making module 1 to actively inhibit execution of the specific action sequence.

In some embodiments, the IN 6110, the SN 6120, the IAEN 6210, and the SAEN 6220 are spiking neurons.

In some embodiments, the IDIN 6310, the SDIN 6320, the IRN 6410, the SRN 6420, LDIN 6610 and the FSIN 6620 are spontaneous spiking neurons.

In some embodiments, a working mode of each spontaneous spiking neuron comprises:

when there is no input signal or the sum of values of input signals is zero, allowing each spontaneous spiking neuron to automatically generate spikes at a first pre-set frequency, wherein said first pre-set frequency is between 10 Hz and 100 Hz;

when the sum of the input signals is positive, increasing a spike generation frequency of each spontaneous spiking neuron until the spike generation frequency reaches an upper threshold value of the first pre-set frequency, wherein the larger the sum of values of the input signals is, the larger the spike generation frequency of the spontaneous spiking neurons will be, and vice versa; and when the sum of values of the input signals is negative, reducing the spike generation frequency of each spontaneous spiking neuron until the spike generation process of each spontaneous spiking neuron stops generating the spikes, wherein the greater an absolute value of the sum of values of the input signals is, the lower the spike generation frequency of each spontaneous spiking neuron will be, and vice versa.

In some embodiments, the working mode of the FSIN 6620 is the same as said working mode of the spontaneous spiking neuron, the first pre-set frequency of the working mode of the FSIN 6620 is set to be between 20 Hz and 200 Hz. In such case, the connection of the output is set to be inhibitory so as to shut down the target down-stream neurons.

In some embodiments, the basic control unit 65 comprises five control pathways comprising 1) an active start control pathway, 2) an active stop control pathway, 3) an automatic start control pathway, 4) an automatic stop control pathway, and 5) a competing selection control pathway.

The active start control pathway comprises the IN 6110, the IAEN 6210, the IDIN 6310, and the IRN 6410 in the basic control unit 65, and the connections among the IN 6110, the IAEN 6210, the IDIN 6310, and the IRN 6410 in the basic control unit 65, wherein the active start control pathway is configured to initiate and continuously execute a first meta-action encoded by said basic control unit 65.

The active stop control pathway comprises the SN 6120, the SAEN 6220, the SDIN 6320, and the SRN 6420 in the basic control unit 65, and the connections the SN 6120, the SAEN 6220, the SDIN 6320, and the SRN 6420 in the basic control unit 65, wherein the active stop control pathway is configured to inhibit and stop the first meta-action encoded by said basic control unit 65.

The automatic start control pathway comprises an automatic start signal output of the automatic decision-making module 2, the IDINs 6310 in the basic control unit 65, and connections between IDINs 6310 and the automatic start signal output, wherein the automatic start control pathway is configured to initiate and execute a second meta-action that is automatically selected.

The automatic stop control pathway comprises an automatic stop signal output of the automatic decision-making module 2, the SDINs in said basic control unit 65, and connections between the SDINs and the automatic start signal output 2, wherein the automatic stop control pathway is configured to inhibit and stop the second meta-action that is automatically selected.

The competing selection control pathway comprises the IN 6110, the SRN 6420, the IDINs 6310 of one or more competing basic control units 65, and connections between the IN 6110, the SRN 6420, the IDINs 6310 of one or more competing basic control units 65, wherein the competing selection control pathway is configured to filter out a winning meta-action for execution by allowing a plurality of alternative meta-actions to compete with each other.

In one embodiment, when there is no need to perform an action, only the IDIN 6310 in the active start control pathway of each basic control unit 65 spontaneously generates spiking signals. In such case, said IDIN 6310 completely inhibits the IRN 6410 through inhibitory connections, so that no action will occur.

In one embodiment, when the active decision-making module 1 selects to perform a respective action sequence, the active decision-making module 1 sends an active start signal P to the IN 6110 in the basic control unit 65 corresponding to part of or all meta-actions in the respective action sequence, so as to enable the IN 6110 to start or accelerate spiking signals generation, and thereby enabling the IAEN 6210 to start or accelerate spiking signals generation. The IDIN 6310 is caused to slow down the speed of the spiking signals generation under the inhibition action of the IAEN 6210. By enabling the IRN 6410 to start or accelerate spiking signals generation through disinhibition and further allowing the IN 6110 to be activated through positive feedback connections, the meta-action corresponding to the basic control unit 65 can be initiated and continuously performed. The connection between the IAENs 6210 in each basic control unit 65 involved in said respective action sequence enables each meta-action in said respective action sequence to be sequentially performed according to a certain rhythm until the execution of said respective action sequence is completed.

In one embodiment, when the active decision-making module 1 sends an active stop signal Q and inputs the active stop signal Q to the SN 6120 in a designated basic control unit 65 to enable the SN 6120 to start or accelerate spiking signals generation, so as to enable the SAEN 6220 to start or accelerate spike generation. The SDIN 6320 slows down the speed of spiking signals generation under the inhibition action of the SAEN 6220. The SRN 6420 can be induced to start or speed up the spiking signals generation by disinhibition, and the IDIN 6310 can be induced to start or speed up the spiking signals generation through the positive feedback connection, which inhibits the spiking signals generation of the SRN 6410, thus inhibiting and stopping the meta-action encoded by the basic control unit 65.

In one embodiment, when the automatic decision-making module 2 sends an automatic start signal, and inputs the automatic start signal to the IDIN 6310 in a designated basic control unit 65 to enable the IDIN 6310 to slow down the speed of the spiking signals generation, thereby enabling the IRN 6410 to start or accelerate spiking signals generation through disinhibition, and initiate and continuously perform said action through the positive feedback loop of the active-start-control path.

In one embodiment, when the automatic decision-making module 2 sends an automatic stop signal, and inputs the automatic stop signal to the SDIN 6320 in the designated basic control unit 65 to enable the SDIN 6320 to slows down the speed of spiking signals generation, thereby enabling the SRN 6420 to start or accelerate the spiking signals generation through disinhibition. The IDIN 6310 is enabled to start or accelerate spiking signals generation through the positive feedback connection, so that the spiking signals generation of the IRN 6410 is inhibited and the meta-action encoded by said designated basic control unit 65 is inhibited and stopped accordingly.

In some embodiments, the compound control module 6 is configured to support three working modes, wherein the three working modes comprises an active supervision mode, an automatic mode, and a feedback driving mode.

In the active supervision mode, the active decision-making module 1 is configured to decide how to perform the action sequences and provide demonstration, so that the compound control module 6 learns a new action sequence or updates or adjusts existing action sequences. In the active supervision mode, sequential execution of the action sequences is mainly driven by the active decision-making module 1. Said active decision-making module 1 is configured to indicate which meta-action in the action sequences should be executed or stopped at every moment and the intensity of each meta-action, and to input the active start signal P and the active stop signal Q to the neuron for the IN 6110 and the SN 6120 in a corresponding basic control unit 65 respectively.

Said active supervision mode is suitable for demonstration learning and imitation learning.

In the automatic mode, with no or little intervention of the active decision-making module 1, or the automatic decision-making module 2 is configured to provide initial meta-actions, and the compound control module 6 is configured to automatically complete the sequential execution of the action sequences. In the automatic mode, the sequential execution of the action sequence is mainly driven by the connections between the neurons of the motion encoding layers 62 of the multiple basic control units 65. The active decision-making module 1 or the automatic decision-making module 2 are configured to only need to provide a certain meta-action in the action sequences as the starting point, and to control the pathway through an active-start-control pathway or an active-stop-control pathway to provide the start signal such that the rest of the action sequences can be automatically executed in sequence until the end of the action sequences.

One advantage of this automatic mode is that the action sequence can be executed from any of the meta actions, and the entry is flexible, such that this mode can support the robot system to execute from different initial states of the task and flexibly adapt to the manipulated object and interference. In addition, the automatic execution of the action mainly depends on the action sequences encoded by the compound control unit (through the synaptic weight of the connections between the neurons in the motion encoding layer 62), thereby saving the calculation workload of the active decision-making module 1 and the automatic decision-making module 2.

In the feedback driving mode, actions are configured to be adjusted through the feedback so that the brain-like decision-making and motion control system automatically adapts to the external environment, wherein in the feedback drive mode, the execution of the actions or the action sequences is configured to be driven by feedback signals, wherein the evaluation module 3 is configured to input the feedback signals to the neurons of the motion encoding layer of the compound control module 6 such that when the brain-like decision-making and motion control system receives a reward, the feedback signals enable the IAEN 6210 to obtain a first preset excitatory input bias and enable the SAEN 6220 to obtain a first preset inhibitory input bias, thereby making the actions easier to occur or make current action greater in magnitude, force, and duration, wherein when the brain-like decision-making and motion control system receives punishment, the feedback signals are configured to make the IAEN 6210 to get a second preset inhibitory input bias, and to make the SAEN 6220 to obtain a second preset excitatory input bias such that that the actions are less likely to occur, or the amplitude and force of the current action are reduced or even ended early.

The advantage of said feedback driving mode is that the control system can adjust the action sequence according to the external feedback, so as to exploit advantages or avoid disadvantages and adapt to the external operating environment.

The active supervision mode, the automatic mode, and the feedback driving mode are configured to be performed independently or cooperatively.

In some embodiments, a proportional relationship between the number of the neurons of the active control layer and the number of the neurons of the motion encoding layer 62 is configured as 1:N, wherein N is a rational number greater than or equal to 1, wherein each neuron in active control layer 61 are configured to connect to one or more neurons in the motion encoding layers 62, wherein the synaptic plasticity processes of each connection between the neurons in the active control layer and the neurons in the motion encoding layer 62 enable said each connection to adjust the synaptic weights according to firing conditions of up-stream neurons and down-stream neurons so that the neurons in the motion encoding layer automatically correspond to the meta-actions to realize population encoding of the neurons.

In some embodiments, the synaptic plasticity process of the connection between the neurons of the active control layer 61 and the neurons of the motion encoding layer 62 is configured to be modulated according to an error feedback signal transmitted from the evaluation module 3 based on a modulation process.

Said modulation process comprises one or more of:
when the error feedback value is positive, the long term potentiation of the synapse connecting the IN 6110 and the IAEN 6210 is positively correlated with the error feedback value, whereas the long term depression of the just mentioned synapse is negatively correlated with the error feedback value, wherein the long-term potentiation of the synapse connecting the SN 6120 and the SAEN 6220 is negatively correlated with the error feedback value, whereas the long term depression of the just mentioned synapse is positively correlated with the error feedback value;
when the error feedback value is negative, the long-term potentiation of the synapses connecting the IN 6110 and the IAEN 6210 is negatively correlated with the absolute value of the error feedback value, whereas the long term depression of the just mentioned synapse is positively correlated with the absolute value of error feedback value, wherein the long-term potentiation of the synapses connecting SN 6120 and the SAEN is positively correlated with the absolute value of the error feedback value, wherein the long-term depression of the just mentioned synapse is negatively correlated with the absolute value of the error feedback value; and
when the error feedback value is zero, maintaining a weight adjustment coefficient or a weight variation of the synaptic plasticity process of the connections between the neurons of the active control layer 61 and the neurons of the motion encoding layer 62 at a first pre-set value, such that the compound control module 6 is able to slowly consolidate the connections between the neurons of the active control layer and the neurons of the motion encoding layer when the compound control module 6 is repeatedly executing or anticipating the existing action sequences.

In some embodiments, the inhibitory connections between the IAENs of each basic control unit adopts an anti-hebbian asymmetrical delaying synaptic plasticity process to adjust the synaptic weights.

Figure 7:
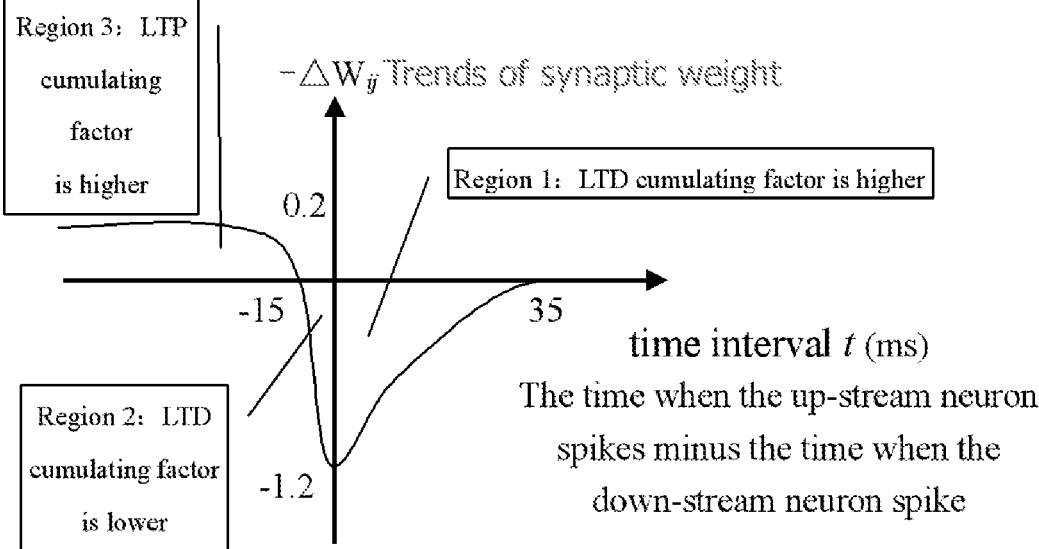
FIG. 7 illustrates a schematic diagram of anti-hebbian asymmetrical delaying synaptic plasticity process of the brain-like decision-making and motion control system according to one embodiment of the present disclosure.

Referring to FIG. 7, the anti-hebbian asymmetrical delaying synaptic plasticity process comprises:
step 1: initializing a long term depressive (LTD) cumulating factor and a long term potentiative (LTP) cumulating factor of a respective synapse to zero;
step 2: when a respective neuron is firing, increasing the LTD cumulating factor of the synapse between the respective neuron and the down-stream neuron of the respective neuron if a down-stream neuron of the respective neuron is also firing within a short enough time window, wherein an increased amount of the LTD cumulating factor is negatively correlated with a time interval between spiking time of the two neurons, or increasing an absolute value of the LTP cumulating factor by a first preset constant if the down-stream neuron is not firing within a short enough time window;
step 3: gradually decaying the LTD cumulating factor and the LTP cumulating factor over time until the LTD cumulating factor and the LTP cumulating factor return to zero;
step 4: when an error feedback value is positive, weighting the LTD cumulating factor and the LTP cumulating factor of the respective synapses to create a first weighted value, multiplying said first weighted value by the error feedback value to create a first multiplied value, superposing the first multiplied value to synaptic weights subsequently, and setting the LTD cumulating factor and the LTP cumulating factor to zero; and
step 5: when the error feedback value is negative, weighting the LTD cumulating factor and the LTP cumulating factor of the respective synapses to create a second weighted value, multiplying said second weighted value by the absolute value of the error feedback value to create a second multiplied value, superposing the second multiplied value to the synaptic weights subsequently, and setting the LTD cumulating factor and the LTP cumulating factor to zero.

The step 1 of the anti-hebbian asymmetrical delaying synaptic plasticity process is performed when the brain-like decision-making and motion control system is initialized.

The step 2, the step 3, the step 4 and the step 5 of anti-hebbian asymmetrical delaying synaptic plasticity process are performed in any order and can be repeated.

In some embodiments, a proportional relationship between the number of neurons of the active control layer and the number of the neurons of the relay layer is configured as 1:N, wherein N is a rational number greater than or equal to 1, wherein each neuron in the relay layer are configured to connect to the one or more neurons in the active control layer, wherein the synaptic plasticity processes of each connection between the neurons in the active control layer and the neurons in the relay layer enable said each connection to adjust the synaptic weights according to firing conditions of up-stream neurons and down-stream neurons so that the neurons in the relay layer automatically correspond to the meta-actions to realize population encoding of the neurons.

The brain-like decision-making and motion control system proposed in the present disclosure may be implemented by software, firmware, or hardware. For example, the system may be embedded in a chip that supports spiking neural network, and may be integrated into a robotic system.

During use of the brain-like decision-making and motion control system, the number of the basic control units 65, the proportional relationship between the number of the neurons of the active control layer 61 and the number of the neurons of the motion encoding layer 62, and the proportional relationship between the number of the neurons of the relay layer 64 and the number of the neurons of the active control layer 61 are determined as needed. Generally, the more the different action sequences that need to be encoded, and the longer a single action sequence, the more the number of the neurons in the basic control unit 65 should be, i.e., the more neurons in the motion encoding layer 62 should be. The more the number of different meta-actions that need to be used, the more neurons in the active control layer 61 and the relay layer 64 should be. Each basic control unit 65 corresponds to one meta-action, whereas the same meta-action can be encoded and influenced by multiple basic control units 65 comprehensively.

The above are only optional embodiments of the present application, and are not intended to limit the present application. Various modifications and variations of this application are possible for those skilled in the art. Any modification, equivalent replacement, improvement, etc. made within the spirit and principle of this application shall be included within the scope of the claims of this application.

What is claimed is:

1. A brain-like decision-making and motion control system for a robot, the brain-like decision-making and motion control system being implemented in embedded hardware and integrated into the robot, the brain-like decision-making and motion control system comprising an active decision-making module; an automatic decision-making module; an evaluation module; a memory module; a perceptual module; a compound control module; an input channel module; an output channel module; and a controlled object module, wherein the controlled object module comprises one or more executive elements, wherein the active decision-making module is configured to synthesize perceptual information from the perceptual module and memory information from the memory module so as to actively select a first target and a first operation in combination with decision rules and instruct the compound control module to perform the first operation, and to control the input channel module and the output channel module, wherein the automatic decision-making module is configured to automatically select a second target and a second operation to be performed according to an experience value, the perceptual information and the memory information when a computational load of the active decision-making module is heavy or when a prompt response is needed by the brain-like decision-making and motion control system, to instruct the compound control module to perform the second operation, and to assist the active decision-making module to make decisions, wherein the evaluation module is configured to evaluate a practical value of a performed target and an actual effect value of a performed operation through a feedback of an internal state or an external environment of the brain-like decision-making and motion control system, and to return a predictive error to the active decision-making module, the automatic decision-making module and/or the compound control module, wherein the memory module is configured to encode and record historical information of an internal state of the brain-like decision-making and motion control system and historical information of the external environment into the memory information, and to transmit the memory information to the active decision-making module and/or the automatic decision-making module to assist a decision process, and to transmit the memory information to the compound control module to affect a selection and an execution of action sequences, wherein the perceptual module is configured to process sensing information obtained from one or more sensors into the perceptual information, and to transmit the perceptual information to the active decision-making module, the automatic decision-making module, the evaluation module, the memory module, and the compound control module, wherein the compound control module comprises a plurality of basic control units, wherein each basic control unit comprises a plurality of neurons, wherein the plurality of neurons comprises at least one first neuron configured to accept input from the active decision-making module, wherein the plurality of neurons of each basic control unit comprises at least one second neuron configured to be connected with one or more neurons located in said each basic control unit to form unidirectional or reciprocal excitatory or inhibitory connections, wherein the plurality of neurons of each basic control unit comprises at least one third neuron configured to be connected with one or more neurons located in at least one basic control unit other than said each basic control unit to form the unidirectional or reciprocal excitatory or inhibitory connections, wherein the plurality of neurons comprises at least one fourth neuron configured to be connected to the output channel module or the evaluation module, wherein the connections are configured to learn, memorize, encode, control, anticipate or execute one or more action sequences through synaptic plasticity processes, and to assist the active decision-making module to perform among the action sequences, wherein the input channel module is configured to convert, relay, and amplify the perceptual information transmitted from the perceptual module, and output the perceptual information to the active decision-making module or the autonomous decision-making module and/or the compound control module respectively, wherein the input channel module is configured to accept a control signal input from the active decision-making module to adjust signal relay magnification, wherein the output channel module is configured to convert, relay, amplify an output signal of the compound control module, and to transmit the output signal to the controlled object module, wherein the output channel module is configured to accept a control signal input from the active decision-making module to adjust the signal relay magnification, and wherein the output signal is used by the output channel module to generate actuation control signals used by the controlled object module for the executive elements; and wherein the automatic decision-making module comprises a target set and a target-operation-effect set, wherein the target set is configured to record one or more appeared targets that have appeared, and to record a respective experience value of each appeared target, wherein the target set is configured to set the respective experience value of each target that has not appeared as a respective second pre-set value, wherein the target-operation-effect set is configured to record one or more respective pre-set operations that can be performed under each appeared/not-yet-appeared target and a respective experience effect value of each respective pre-set operation, wherein the automatic decision-making module is configured to select a first potential selected target from the appeared targets that have appeared, wherein said first potential selected target is with a maximum experience value among the appeared targets, wherein the automatic decision-making module is then configured to transmit the first potential selected target and the respective experience value of the first potential selected target to the evaluation module, and to select a first potential selected operation from the target-operation-effect set according to the first potential selected target, wherein the first potential selected operation is with a maximum respective experience effect value among the respective pre-set operations corresponding to the first potential selected target from the target-operation-effect set, and to transmit the first potential selected operation and the respective experience effect value of the first potential selected operation to the evaluation module, wherein the automatic decision-making module is further configured to send the first potential selected target and the first potential selected operation to the active decision-making module to form a consensus, and to transmit the first potential selected operation in a form of spiking signal to the compound control module through an active-start-control pathway and an active-stop-control pathway if the active decision-making module does not defer or deny, wherein the active decision-making module is further configured to determine a final decision rule if the active decision-making module denies, wherein if the active decision-making module transmits a second potential selected operation, which is determined by the active decision-making module, to the compound control module and if the automatic decision-making module transmit the selected potential operation to the compound control module, the compound control module is then configured to synthesize the first potential selected operation and the second potential selected operation, and wherein when receiving a predictive error signal of the first potential selected operation or first potential selected target the executable operation or the respective target of the executable operation transmitted from the evaluation module, the active decision-making module is configured to add a predictive error to a current comprehensive value of said first potential selected target or a current comprehensive effect value of said first potential selected operation to obtain an updated comprehensive value or an updated comprehensive effect value, and to update the updated comprehensive value and the updated comprehensive effect value into the target set and the target-operation-effect set, respectively.

2. The brain-like decision-making and motion control system of claim 1, wherein the evaluation module comprises a cache and an evaluation rule set, wherein when the active decision-making module transmits the first target and a comprehensive value of the first target or transmits a first operation and a comprehensive effect value of the first operation to the evaluation module, the evaluation module is configured to cache the first target, the comprehensive value of the first target, the first operation, and the comprehensive effect value of the first operation, wherein when the feedback or a result is obtained by the brain-like decision-making and motion control system, the evaluation module is configured to evaluate an actual value of the first target or an actual effect value of the first operation according to evaluation rules in the evaluation rule set, and to subtract the cached comprehensive value of the first target from the actual value of the first target or subtract the cached comprehensive effect value of the first operation from the actual effect value of the first operation to obtain a predictive error of the first target or the first operation, and to further transmit the predictive error to the active decision-making module so as to correct the comprehensive value of the first target or the first operation stored in the active decision-making module, wherein when the automatic decision-making module transmits the second target and an experience value of the second target or transmits a second operation and an experience effect value of the second operation to the evaluation module, the evaluation module is configured to cache the second target, the experience value of the second target, the second operation, and the experience effect value of the second operation, wherein when the feedback or the result is obtained by the brain-like decision-making and motion control system, the evaluation module is configured to evaluate the actual value of the second target or the actual effect value of the first operation according to the evaluation rules, and to subtract the cached experience value of the second target from the actual value of the first target or subtract the cached experience effect value of the first operation from the actual effect value of the first operation to obtain the predictive error of the second target or the second operation, and to further transmit said predictive error to the active decision-making module so as to correct the comprehensive value of the first target or the first operation stored in the active decision-making module, wherein the evaluation module is further configured to transmit the predictive error to the compound control module to correct the action sequences encoded by the compound control module and a predictive effect value of the action sequences.

3. The brain-like decision-making and motion control system of claim 1, wherein the executive elements are configured as one or more motors, hydraulic components, pneumatic components or artificial muscles, wherein each executive element is coupled to the one or more basic control units through the output channel module so as to perform at least one meta-action, wherein a pair of executive elements are respectively coupled to the one or more basic control units through the output channel module to form antagonistic control.

4. The brain-like decision-making and motion control system of claim 1, wherein the basic control unit is divided into an output basic control unit and a predictive control unit according to an output connection mode;

wherein the output basic control unit's output is connected to the output channel module to drive the executive elements, wherein the predictive basic control unit's output is coupled to the evaluation module to predict a predictive effect value of the action sequences without actually executing said action sequences.

5. The brain-like decision-making and motion control system of claim 1, wherein the executive elements include motors, hydraulic components, pneumatic components, and/ or artificial muscles.

6. The brain-like decision-making and motion control system of claim 5, wherein the actuation control signals used by the controlled object module are for the executive elements to perform meta-actions that produce movement or mechanical execution by the robot in response to or in interaction with external environmental conditions.

7. A brain-like decision-making and motion control system for a robot, the brain-like decision-making and motion control system being implemented in embedded hardware and integrated into the robot, the brain-like decision-making and motion control system comprising an active decision-making module; an automatic decision-making module; an evaluation module; a memory module; a perceptual module; a compound control module; an input channel module; an output channel module; and a controlled object module, wherein the controlled object module comprises one or more executive elements, wherein the active decision-making module is configured to synthesize perceptual information from the perceptual module and memory information from the memory module so as to actively select a first target and a first operation in combination with decision rules and instruct the compound control module to perform the first operation, and to control the input channel module and the output channel module, wherein the automatic decision-making module is configured to automatically select a second target and a second operation to be performed according to an experience value, the perceptual information and the memory information when a computational load of the active decision-making module is heavy or when a prompt response is needed by the brain-like decision-making and motion control system, to instruct the compound control module to perform the second operation, and to assist the active decision-making module to make decisions, wherein the evaluation module is configured to evaluate a practical value of a performed target and an actual effect value of a performed operation through a feedback of an internal state or an external environment of the brain-like decision-making and motion control system, and to return a predictive error to the active decision-making module, the automatic decision-making module and/or the compound control module, wherein the memory module is configured to encode and record historical information of an internal state of the brain-like decision-making and motion control system and historical information of the external environment into the memory information, and to transmit the memory information to the active decision-making module and/or the automatic decision-making module to assist a decision process, and to transmit the memory information to the compound control module to affect a selection and an execution of action sequences, wherein the perceptual module is configured to process sensing information obtained from one or more sensors into the perceptual information, and to transmit the perceptual information to the active decision-making module, the automatic decision-making module, the evaluation module, the memory module, and the compound control module, wherein the compound control module comprises a plurality of basic control units, wherein each basic control unit comprises a plurality of neurons, wherein the plurality of neurons comprises at least one first neuron configured to accept input from the active decision-making module, wherein the plurality of neurons of each basic control unit comprises at least one second neuron configured to be connected with one or more neurons located in said each basic control unit to form unidirectional or reciprocal excitatory or inhibitory connections, wherein the plurality of neurons of each basic control unit comprises at least one third neuron configured to be connected with one or more neurons located in at least one basic control unit other than said each basic control unit to form the unidirectional or reciprocal excitatory or inhibitory connections, wherein the plurality of neurons comprises at least one fourth neuron configured to be connected to the output channel module or the evaluation module, wherein the connections are configured to learn, memorize, encode, control, anticipate or execute one or more action sequences through synaptic plasticity processes, and to assist the active decision-making module to perform among the action sequences, wherein the input channel module is configured to convert, relay, and amplify the perceptual information transmitted from the perceptual module, and output the perceptual information to the active decision-making module or the autonomous decision-making module and/or the compound control module respectively, wherein the input channel module is configured to accept a control signal input from the active decision-making module to adjust signal relay magnification, wherein the output channel module is configured to convert, relay, amplify an output signal of the compound control module, and to transmit the output signal to the controlled object module, wherein the output channel module is configured to accept a control signal input from the active decision-making module to adjust the signal relay magnification, and wherein the output signal is used by the output channel module to generate actuation control signals used by the controlled object module for the executive elements;

wherein the active decision-making module comprises a target set, a target-operation-effect set, and a decision rule set, wherein the target set is configured to record one or more appeared targets that have appeared, and a respective comprehensive value and a respective urgency value of each appeared target, and to set the respective comprehensive value of each target that has not appeared as a first pre-set value to represent a curiosity value for each target that has not appeared, wherein the target-operation-effect set is configured to record one or more executable operations each is executable for a respective target, and to record a respective comprehensive effect value of each executable operation in this situation, wherein the decision rule set is configured to record the decision rules, wherein said decision rules comprise first decision rules defined by users and second decision rules newly learned by the brain-like decision-making and motion control system, wherein the decision rules are configured to specify how the brain-like decision-making and motion control system selects a potential selected target and a potential selected operation, wherein after a first potential selected target is selected by the active decision-making module, the active decision-making module is configured to transmit the first potential selected target and the respective comprehensive value of the first potential selected target to the evaluation module, and to select a first potential selected operation according to the first potential selected target from the target-operation-effect set, wherein the active decision-making module is configured to perform, if a second potential selected target and a second potential selected operation selected by the automatic decision-making module are transmitted from the automatic decision-making module to the active decision-making module, weighting on the first potential selected target and the first potential selected operation and the second potential selected target and the second potential selected operation to generate a final decision, wherein after the active decision-making module has decided to perform a decided operation according to the final decision, the active decision-making module is configured to transmit the executable operation and the comprehensive effect values of the executable operation to the evaluation module, and to transmit the executable operation in a form of an spiking sequence signal to the compound control module through an active-start-control pathway and an active-stop-control pathway, wherein when receiving a predictive error of the executable operation or the respective target of the executable operation transmitted from the evaluation module, the active decision-making module is configured to add the predictive error to a current comprehensive value of said corresponding target or a current comprehensive effect value of the executable operation to obtain an updated comprehensive value or an updated comprehensive effect value, and to update the updated comprehensive value and the updated comprehensive effect value into the target set and the target-operation-effect set, respectively.

8. The brain-like decision-making and motion control system of claim 7, wherein the decision rules comprise target selection rules for the active decision-making module to select the potential selected target, wherein the target selection rules comprise one or more of:

selecting the potential selected target from the one or more appeared targets if the potential selected target is with a largest weighting of the respective comprehensive value and the respective urgency value among the appeared targets;

selecting the potential selected target from the one or more appeared targets if the potential selected target is most relevant to a task among the appeared targets and does not conflict with the first decision rules and the second decision rules;

selecting the potential selected target from the appeared targets if the potential selected target is a most obvious target among the appeared targets;

selecting the potential selected target by the automatic decision-making module;

selecting the potential selected target randomly;

selecting the potential selected target by selecting a hypothetical target that has not appeared; and selecting the potential selected target by ignoring the appeared targets and directly entering an operation selection process, wherein the decision rules comprises operation selection rules, wherein the operation selection rules comprise one or more of:

selecting the potential selected operation with a maximum comprehensive effect value corresponding to the potential selected target in the target-operation-effect set;

performing a trial and error learning and selecting the potential selected operation randomly;

performing an imitation learning and executing a new action sequence by actively supervising the compound control module;

taking no action and waiting;

performing an automatic selection operation by the automatic decision-making module; and performing a predictive learning and rehearsal of a set of actions without actually performing said actions so as to predict effect values of the actions.

9. A brain-like decision-making and motion control system for a robot, the brain-like decision-making and motion control system being implemented in embedded hardware and integrated into the robot, the brain-like decision-making and motion control system comprising an active decision-making module; an automatic decision-making module; an evaluation module; a memory module; a perceptual module; a compound control module; an input channel module; an output channel module; and a controlled object module, wherein the controlled object module comprises one or more executive elements, wherein the active decision-making module is configured to synthesize perceptual information from the perceptual module and memory information from the memory module so as to actively select a first target and a first operation in combination with decision rules and instruct the compound control module to perform the first operation, and to control the input channel module and the output channel module, wherein the automatic decision-making module is configured to automatically select a second target and a second operation to be performed according to an experience value, the perceptual information and the memory information when a computational load of the active decision-making module is heavy or when a prompt response is needed by the brain-like decision-making and motion control system, to instruct the compound control module to perform the second operation, and to assist the active decision-making module to make decisions, wherein the evaluation module is configured to evaluate a practical value of a performed target and an actual effect value of a performed operation through a feedback of an internal state or an external environment of the brain-like decision-making and motion control system, and to return a predictive error to the active decision-making module, the automatic decision-making module and/or the compound control module, wherein the memory module is configured to encode and record historical information of an internal state of the brain-like decision-making and motion control system and historical information of the external environment into the memory information, and to transmit the memory information to the active decision-making module and/or the automatic decision-making module to assist a decision process, and to transmit the memory information to the compound control module to affect a selection and an execution of action sequences, wherein the perceptual module is configured to process sensing information obtained from one or more sensors into the perceptual information, and to transmit the perceptual information to the active decision-making module, the automatic decision-making module, the evaluation module, the memory module, and the compound control module, wherein the compound control module comprises a plurality of basic control units, wherein each basic control unit comprises a plurality of neurons, wherein the plurality of neurons comprises at least one first neuron configured to accept input from the active decision-making module, wherein the plurality of neurons of each basic control unit comprises at least one second neuron configured to be connected with one or more neurons located in said each basic control unit to form unidirectional or reciprocal excitatory or inhibitory connections, wherein the plurality of neurons of each basic control unit comprises at least one third neuron configured to be connected with one or more neurons located in at least one basic control unit other than said each basic control unit to form the unidirectional or reciprocal excitatory or inhibitory connections, wherein the plurality of neurons comprises at least one fourth neuron configured to be connected to the output channel module or the evaluation module, wherein the connections are configured to learn, memorize, encode, control, anticipate or execute one or more action sequences through synaptic plasticity processes, and to assist the active decision-making module to perform among the action sequences, wherein the input channel module is configured to convert, relay, and amplify the perceptual information transmitted from the perceptual module, and output the perceptual information to the active decision-making module or the autonomous decision-making module and/or the compound control module respectively, wherein the input channel module is configured to accept a control signal input from the active decision-making module to adjust signal relay magnification, wherein the output channel module is configured to convert, relay, amplify an output signal of the compound control module, and to transmit the output signal to the controlled object module, wherein the output channel module is configured to accept a control signal input from the active decision-making module to adjust the signal relay magnification, and wherein the output signal is used by the output channel module to generate actuation control signals used by the controlled object module for the executive elements;

wherein each basic control unit comprises an active control layer; a motion encoding layer; a disinhibition layer; and a relay layer, wherein the active control layer comprises an initiating neuron (IN) and a stopping neuron (SN), wherein the motion encoding layer comprises an initiating action encoding neuron (IAEN) and a stopping action encoding neuron (SAEN), wherein the disinhibition layer comprises an initiating disinhibitory neuron (IDIN) and a stopping disinhibitory neuron (SDIN), wherein the relay layer comprises an initiating relay neuron (IRN) and a stopping relay neuron (SRN), wherein in the active control layer, the IN is configured to receive an active start signal from the active decision-making module and an excitatory connection of the IRN, the SN is configured to receive an active stop signal from the active decision-making module, the IN and the SN are configured to respectively synthesize and encode input signals into spiking signals and output the spiking signals to the IAEN and the SAEN in the motion encoding layer;

wherein in the motion encoding layer, the IAEN is configured to receive excitatory input signals from the IN, and the SAEN is configured to receive the excitatory input signals from the SN, wherein the IAEN and the SAEN are configured to receive the input signals from the memory module, the perceptual module and the evaluation module, wherein the IAEN and the SAEN are configured to respectively synthesize the input signals to generate the spiking signals so as to modulate pulse discharge frequency and phase of the IDIN and the SDIN in the disinhibition layer, wherein one or more reciprocal inhibitory connections are between the IAEN and the SAEN in a same basic control unit, wherein relative action intensity and relative duration of the meta-action corresponding to said same basic control unit are configured to be encoded by synaptic weights, wherein the reciprocal inhibitory connections are between the IAENs in multiple basic control units, wherein an execution sequence of a respective meta-action in the action sequences is configured to be encoded by the synaptic weights, wherein the inhibitory connections are between the IAENs and the SAENs in different basic control units, wherein a relative start time and a relative stop time of the respective meta-action in the action sequences are configured to be encoded by the synaptic weights, wherein in the disinhibition layer, the IDIN is configured to receive inhibitory input signals from the IAEN and the SDIN, and the excitatory input signals from the SRN, and to synthesize all the input signals to generate the spiking signals, and to modulate the pulse discharge frequency and phase of the IRN through the inhibitory connections, wherein the SDIN is configured to receive the inhibitory input signals from the SAEN and the excitatory input signals from the SRN, and to synthesize all the input signals to generate the spiking signals, and to modulate the pulse discharge frequency and phase of the SRN through the inhibitory connections, wherein in the relay layer, the IRN is configured to receive the inhibitory input signals from the IDIN, and to form a positive feedback closed loop so as to promote motion execution through the excitatory connection projected to the IN, wherein the SRN is configured to receive the excitatory input signals from the SN and the inhibitory input signals from the SDIN, to synthesize all the input signals to generate the spiking signals, and to project the spiking signals to the IDIN through the excitatory connection to form a pathway for inhibiting execution of actions, wherein the IN, the SN, the IAEN, the SAEN, the IDIN, the SDIN, the IRN and the SRN are served as outputs of the basic control units.

10. The brain-like decision-making and motion control system of claim 9, wherein the compound control module further comprises one or more auxiliary control units, wherein each auxiliary control unit comprises an active selection signal input terminal, an active de-selection signal input terminal, a lateral disinhibitory neuron (LDIN), and a fast spontaneous inhibitory neuron (FSIN);

wherein the one or more basic control units are configured to form a group of the basic control units, and each group of the basic control units encodes the action sequence, wherein the IAEN and the SAEN in the same basic control unit are respectively connected to the LDIN, wherein each group of the basic control units is configured to share one or more FSINs, wherein the LDIN is configured to synthesize the active selection signal input and the input of the neurons in the motion encoding layer of the basic control unit to generate the spiking signals and output the spiking signal to the FSIN in other groups of basic control units through the inhibitory connections, wherein the FSIN is configured to synthesize the active de-selection signal input and inputs of the LDIN in adjacent groups of the basic control units to generate the spiking signals and output the spiking signals to each motion control layer of the group of the basic control units through the inhibitory connections, wherein the active selection signal input is configured to accept the input from the active decision-making module to actively select a specific action sequence for execution, wherein the active de-selection signal input is configured to receive an input from the active decision-making module to actively inhibit execution of the specific action sequence.

11. The brain-like decision-making and motion control system of claim 9, wherein the IN, the SN, the IAEN, the SAEN are spiking neurons, wherein the IDIN, the SDIN, the IRN, the SRN, LDIN and the FSIN are spontaneous spiking neurons.

12. The brain-like decision-making and motion control system of claim 11, wherein a working mode of each spontaneous spiking neuron comprises:

when there is no input signal or the sum of values of input signals is zero, allowing each spontaneous spiking neuron to automatically generate spikes at a first pre-set frequency;

when the sum of the input signals is positive, increasing a firing frequency of each spontaneous spiking neuron until the firing frequency reaches an upper threshold value of the first pre-set frequency, wherein the larger the sum of values of the input signals is, the larger the firing frequency of the spontaneous spiking neurons will be, and vice versa; and when the sum of values of the input signals is negative, reducing the firing frequency of each spontaneous spiking neuron until the firing process of each spontaneous spiking neuron stops generating the spikes, wherein the greater an absolute value of the sum of values of the input signals is, the lower the firing frequency of each spontaneous spiking neuron will be, and vice versa.

13. The brain-like decision-making and motion control system of claim 9, wherein the basic control unit comprises five control pathways comprising an active start control pathway, an active stop control pathway, an automatic start control pathway, an automatic stop control pathway and a competing selection control pathway, wherein the active start control pathway comprises the IN, the IAEN, the IDIN, and the IRN in the basic control unit, and the connections among the IN, the IAEN, the IDIN, and the IRN in the basic control unit, wherein the active start control pathway is configured to initiate and continuously execute a first meta-action encoded by said basic control unit, wherein the active stop control pathway comprises the SN, the SAEN, the SDIN, and the SRN in the basic control unit, and the connections among the SN, the SAEN, the SDIN, and the SRN in the basic control unit, wherein the active stop control pathway is configured to inhibit and stop the first meta-action encoded by said basic control unit, wherein the automatic start control pathway comprises an automatic start signal output of the automatic decision-making module, the IDINs in the basic control unit, and connections between IDINs, wherein the automatic start control pathway is configured to initiate and execute a second meta-action that is automatically selected, wherein the automatic stop control pathway comprises an automatic stop signal output of the automatic decision-making module, the SDINs in said basic control unit, and connections between the SDINs and the automatic decision-making module, wherein the automatic stop control pathway is configured to inhibit and stop the second meta-action that is automatically selected, wherein the competing selection control pathway comprises the IN, the SRN, the IDINs of one or more competing basic control units, and connections between the IN, the SRN, the IDINs of one or more competing basic control units, wherein the competing selection control pathway is configured to filter out a winning meta-action for execution by allowing a plurality of alternative meta-actions to compete with each other.

14. The brain-like decision-making and motion control system of claim 9, wherein the compound control module is configured to support three working modes, wherein the three working modes comprises an active supervision mode, an automatic mode, and a feedback driving mode, wherein in the active supervision mode, the active decision-making module is configured to decide how to perform the action sequences and provide demonstration, so that the compound control module learns a new action sequence or updates and adjusts existing action sequences, wherein in the active supervision mode, sequential execution of the action sequences is mainly driven by the active decision-making module, wherein said active decision-making module is configured to indicate which meta-action in the action sequences should be executed or stopped at every moment and the intensity of each meta-action, and to input the active start signal and the active stop signal to the neuron for the IN and the SN in a corresponding basic control unit respectively, wherein in the automatic mode, with no or little intervention of the active decision-making module, or the automatic decision-making module is configured to provide initial meta-actions, and the compound control module is configured to automatically complete the sequential execution of the action sequences, wherein in the automatic mode, the sequential execution of the action sequence is mainly driven by the connections between the neurons of the motion encoding layers of the multiple basic control units, wherein the active decision-making module or the automatic decision-making module are configured to only need to provide a certain meta-action in the action sequences as the starting point, and to control the path through an active-start-control pathway or an active-stop-control pathway to provide the start signal such that the rest of the action sequences can be automatically executed in sequence until the end of the action sequences, wherein in the feedback driving mode, actions are configured to be adjusted through the feedback so that the brain-like decision-making and motion control system automatically adapts to the external environment, wherein in the feedback drive mode, the execution of the actions or the action sequences is configured to be driven by feedback signals, wherein the evaluation module is configured to input the feedback signals to the neurons of the motion encoding layer of the compound control module such that when the brain-like decision-making and motion control system receives a reward, the feedback signals enable the IAEN to obtain a first preset excitatory input bias and enable the SAEN to obtain a first preset inhibitory input bias, thereby making the actions easier to occur or make current action greater in magnitude, force, and duration, wherein when the brain-like decision-making and motion control system receives punishment, the feedback signals are configured to make the IAEN to get a second preset inhibitory input bias, and to make the SAEN to obtain a second preset excitatory input bias such that that the actions are less likely to occur, or the amplitude and force of the current action are reduced or even ended early, wherein the active supervision mode, the automatic mode, and the feedback driving mode are configured to be performed independently or cooperatively.

15. The brain-like decision-making and motion control system of claim 9, wherein a proportional relationship between the number of the neurons of the active control layer and the number of the neurons of the motion encoding layer is configured as 1: N, wherein N is a rational number greater than or equal to 1, wherein the neurons in each active control layer are configured to connect to the neurons in one or more motion encoding layers, wherein the synaptic plasticity processes of each connection between the neurons in the active control layer and the neurons in the motion encoding layer enable said each connection to adjust the synaptic weights according to firing conditions of up-stream neurons and down-stream neurons so that the neurons in the motion encoding layer automatically correspond to the meta-actions to realize population encoding of the neurons.

16. The brain-like decision-making and motion control system of claim 9, wherein the synaptic plasticity process of the connection between the neurons of the active control layer and the neurons of the motion encoding layer is configured to be modulated according to an error feedback signal transmitted from the evaluation module based on a modulation process, wherein said modulation process comprises one or more of:

when the error feedback value is positive, the long term potentiation of the synapse connecting the IN and the IAEN is positively correlated with the error feedback value, whereas the long term depression of the just mentioned synapse is negatively correlated with the error feedback value, wherein the long-term potentiation of the synapse connecting the SN and the SAEN is negatively correlated with the error feedback value, whereas the long term depression of the just mentioned synapse is positively correlated with the error feedback value;

when the error feedback value is negative, the long-term potentiation of the synapses connecting the IN and the IAEN is negatively correlated with the absolute value of the error feedback value, whereas the long term depression of the just mentioned synapse is positively correlated with the absolute value of error feedback value, wherein the long-term potentiation of the synapses connecting SN and the SAEN is positively correlated with the absolute value of the error feedback value, wherein the long-term depression of the just mentioned synapse is negatively correlated with the absolute value of the error feedback value; and when the error feedback value is zero, maintaining a weight adjustment coefficient or a weight variation of the synaptic plasticity process of the connections between the neurons of the active control layer and the neurons of the motion encoding layer at a first pre-set value, such that the compound control module is able to slowly consolidate the connections between the neurons of the active control layer and the neurons of the motion encoding layer when the compound control module is repeatedly executing or anticipating the existing action sequences.

17. The brain-like decision-making and motion control system of claim 9, wherein the inhibitory connections between the IAENs of each basic control unit adopts an anti-hebbian asymmetrical delaying synaptic plasticity process to adjust the synaptic weights;

wherein the anti-hebbian asymmetrical delaying synaptic plasticity process comprises:

step 1: initializing a long term depressive (LTD) cumulating factor and a long term potentiative (LTP) cumulating factor of a respective synapse to zero;

step 2: when a respective neuron is firing, increasing the LTD cumulating factor of the synapse between the respective neuron and the down-stream neuron of the respective neuron if a down-stream neuron of the respective neuron is also firing within a short enough time window, wherein an increased amount of the LTD cumulating factor is negatively correlated with a time interval between firing time of the two neurons, or increasing an absolute value of the LTP cumulating factor by a first preset constant if the down-stream neuron is not firing within a short enough time window;

step 3: gradually decaying the LTD cumulating factor and the LTP cumulating factor over time until the LTD cumulating factor and the LTP cumulating factor return to zero;

step 4: when an error feedback value is positive, weighting the LTD cumulating factor and the LTP cumulating factor of the respective synapses to create a first weighted value, multiplying said first weighted value by the error feedback value to create a first multiplied value, superposing the first multiplied value to the synaptic weights subsequently, and setting the LTD cumulating factor and the LTP cumulating factor to zero; and step 5: when the error feedback value is negative, weighting the LTD cumulating factor and the LTP cumulating factor of the respective synapses to create a second weighted value, multiplying said second weighted value by the absolute value of the error feedback value to create a second multiplied value, superposing the second multiplied value to the synaptic weight subsequently, and setting the LTD cumulating factor and the LTP cumulating factor to zero, wherein the step 1 of the anti-hebbian asymmetrical delaying synaptic plasticity process is performed when the brain-like decision-making and motion control system is initialized, wherein the step 2, the step 3, the step 4 and the step 5 of anti-hebbian asymmetrical delaying synaptic plasticity process are performed in any order and can be repeated.

18. The brain-like decision-making and motion control system of claim 9, wherein a proportional relationship between the number of neurons of the active control layer and the number of the neurons of the relay layer is configured as 1: N, wherein N is a rational number greater than or equal to 1, wherein the neurons in each relay layer are configured to connect to the neurons in one or more active control layer, wherein the synaptic plasticity processes of each connection between the neurons in the active control layer and the neurons in the relay layer enable said each connection to adjust the synaptic weights according to firing conditions of up-stream neurons and down-stream neurons so that the neurons in the relay layer automatically correspond to the meta-actions to realize population encoding of the neurons.

* * * * *